United States Patent [19]
Wagner et al.

[11] 3,922,313
[45] Nov. 25, 1975

[54] PROCESS FOR THE PRODUCTION OF 3-CHLOROPROPANOL-1

[75] Inventors: Hans Wagner; Klaus Udluft, both of Constance, Germany

[73] Assignee: Deutsche Gold- und Silber-Scheideanstalt vormals Roessler, Germany

[22] Filed: Mar. 8, 1974

[21] Appl. No.: 449,389

Related U.S. Application Data

[63] Continuation of Ser. No. 235,061, March 15, 1972, abandoned.

[30] Foreign Application Priority Data

Mar. 30, 1971 Germany............................ 2115327

[52] U.S. Cl.............................. 260/633; 260/604 R
[51] Int. Cl.².......................................... C07C 31/34
[58] Field of Search........................ 260/633, 604 R

[56] References Cited
UNITED STATES PATENTS

2,683,721  7/1954  Schlesinger et al................ 260/633
2,824,897  2/1958  Wujciak et al...................... 260/633

OTHER PUBLICATIONS

Gaylord et al., J.A.C.S., 76, 59–61, 1954.
Houben-Weyl, Methoden der Organischen Chemie, George Thieme, Verlag, Stuttgart, 1962, 5/3, p. 821.
Organic Synthesis, John Wiley Inc., New York, 1928, Vol. III, 54–56.
Chaiken et al, J.A.C.S., 71, 1949, 122–125.
Foerst, Newer Methods of Preparative Organic Chemistry, Academic Press, New York, 1968, 204–205, 209–210, 212, 246.

*Primary Examiner*—Howard I. Mars
*Attorney, Agent, or Firm*—Cushman, Darby & Cushman

[57] ABSTRACT

3-chloropropanol-1 is prepared by reacting acrolein with hydrogen chloride and reducing the chloropropionaldehyde formed with an alkali boranate.

12 Claims, No Drawings

PROCESS FOR THE PRODUCTION OF 3-CHLOROPROPANOL-1

This is a continuation of application Ser. No. 235,061 filed Mar. 15, 1972 and now abandoned.

The invention is directed to a process for the production of 3-chloropropanol-1 from acrolein by reacting acrolein with hydrogen chloride and reduction of the chloropropionaldehyde formed according to the following series of reactions.

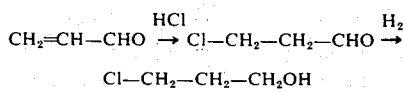

$$CH_2=CH-CHO \xrightarrow{HCl} Cl-CH_2-CH_2-CHO \xrightarrow{H_2} Cl-CH_2-CH_2-CH_2OH$$

3-chloropropanol-1 is a starting material for the production of valuable compounds, for example monoesters of propanediol-1,3 which are solvents employed in the varnish industry.

It is known to produce 3-chloropropanol-1 from acrolein. In such procedure acrolein is epoxidized with hydrogen peroxide, the epoxide hydrogenated to propanediol-1,3 and hydrogen chloride is then allowed to act on this alcohol. The chloropropanol is recovered from the reaction mixture by repeated fractional distillation. [Organic Syntheses (1964) Collective Vol. I, pages 533–534]. The process is cumbersome and expensive and there is obtained an overall yield of only about 40%. It is also known to use sulfur monochloride in place of hydrogen chloride [Houben-Weyl, Methoden der organischen Chemie (1962), Vol. 5/3, page 857]. The yield is not significantly better.

It is also known that 3-chloropropanol-1 can be produced if acrolein is reacted with hydrogen chloride in alcohol and the acetal of chloropropionaldehyde formed is reduced in the presence of ruthenium catalysts (Belgian Pat. No. 634,845). The yield is small. This process is also unsuitable for the economical production of chloropropanol.

There has now been found a process for the production of 3-chloropropanol-1 from acrolein by reaction of acrolein with hydrogen chloride and reduction of the chloropropionaldehyde formed characterized by carrying out the reduction by means of an alkali metal boranate (alkali metal borohydride). Thus there can be used sodium boranate, potassium boranate or lithium boranate. According to this process 3-chloropropanol-1 can be produced in a simple manner suitable for industrial scale operation with yields of about 85% based on the acrolein reacted.

The conversion of an aldehyde into an alcohol by reduction with a hydride in itself is not new. However, it is surprising that it can take place in the case of chloropropionaldehyde since on the one hand it is known that this aldehyde under the influence of hydrides or complex hydrides such as alkali hydrides, alkaline earth hydrides or lithium alanate polymerizes, and on the other hand it is known that halogen containing compounds upon treatment with alkali boranate, even at room temperature, split off hydrogen halide [Foerst, Neuere Methoden der praeparativen organischen Chemie, (1966), Vol. 4 page 221]. According to the process of the invention there occurs neither a polymerization nor a splitting off of a hydrogen halide to a noteworthy extent.

In order to carry out the process of the invention first acrolein is reacted with hydrogen halide to form chloropropionaldehyde. For this purpose the acrolein is preferably employed in an inert organic solvent and the hydrogen chloride introduced as a gas. As solvents there can be used for example aromatic hydrocarbons such as benzene, toluene, cumene, ethyl benzene, xylene, aromatic naphthas, or halogenated hydrocarbons, e.g. carbon tetrachloride, chloroform, methylene chloride, bromoform, ethylene dichloride, ethylene tetrachloride or especially aliphatic or cycloaliphatic ethers such as diethyl ether, dipropyl ether, methyl n-butyl ether, diamyl ether, ethylene glycol dimethyl ether, ethylene glycol diethyl ether, dioxane, tetrahydrofuran or tetrahydropyran. For each mole of acrolein there is required 1 mole of hydrogen chloride. However, it is advantageous to use less than 1 mole, especially about 5 to 10 mole % less than 1 mole, of hydrogen chloride for each mole of acrolein. Suitably the acrolein contains, as is customary, small amounts of polymerization inhibitors, for example, hydroquinone or phenothiazine. The reaction is generally carried out at temperatures between −30° and + 50°C., preferably at temperatures between −10° and +30°C.

The reduction of the chloropropionaldehyde formed to chloropropanol takes place according to the invention with the aid of alkali boranates as pointed out supra. Sodium and potassium boranate are preferred. It is generally suitable to have the alkali boranate present as an aqueous solution, e.g. of 5 to 20% concentration, and to introduce the chloropropionaldehyde into this solution. The chloropropionaldehyde is added in itself or preferably as solution in an inert organic liquid. Chiefly employed are those liquids which have already been mentioned as solvents and which can be used in the reaction of acrolein with the hydrogen chloride. Advantageously the reaction mixture resulting from the production of chloropropionaldehyde from acrolein and hydrogen chloride is directly added to the reduction medium. However, it is also useful to first separate the unreacted acrolein from this mixture.

For each mole of chloropropionaldehyde or each mole of acrolein reacted there is generally used 0.20 to 1.00 mole, preferably 0.25 to 0.40 mole of alkali boranate. The reduction is suitably carried out at temperatures between 0° and 50°C. Especially suitable is the temperature range between 15° and 35°C. The chloropropanol is extracted from the reaction mixture with an organic solvent, e.g. toluene or any other water immiscible solvent for chloropropanol, and separated from the solvent by distillation at reduced pressure, if necessary, after drying of the extract with customary drying agents such as sodium sulfate.

The process of the invention is further explained by the following examples. Unless otherwise indicated, all parts and percentages are by weight.

EXAMPLE 1

70 parts of hydrogen chloride were introduced into a mixture of 88 parts tetrahydrofuran, 2 parts of hydroquinone and 112 parts of acrolein. The temperature of the mixture was 14° to 17°C. In the course of 40 minutes, the reaction mixture was then dropped into a solution of 20 parts of sodium boranate ($NaBH_4$) in 200 parts of water with stirring. The temperature of the mixture was held at 25° to 30°C. After a further 10 minutes the reaction was completed. Then 30 parts of sodium chloride were added. The reaction mixture was extracted twice, each time with 87 parts of toluene. The aqueous phase remaining was discarded. The extracts were combined and at about 20 Torr first the solvent was driven off; then at 10 Torr the pure 3-chloropropanol distilled. There remained a slight residue, a viscous oil, of probably chloropropionaldehyde trimer. There were recovered 146 parts of 3-chloropropanol-1, corresponding to a yield of 77% based on the acrolein added. The 3-chloropropanol-1 had a boiling point (B.P.$_{10}$) of 54° to 57°C. and a refractive index ($n_D^{20}$) of 1.4443.

EXAMPLE 2

Into a mixture of 103 parts of 1,4-dioxane, 2 parts of hydroquinone and 112 parts of acrolein, there were introduced 63 parts of hydrogen chloride at 12° to 18°C. The excess acrolein was first driven off from the reaction mixture under reduced pressure at 15°C. Then the reaction mixture was dropped into a solution of 20 parts of sodium boranate in 200 parts of water at 20° to 30°C in the course of 30 minutes. The working up of the product was accomplished as described in example 1. There were recovered 146 parts of 3-chloropropanol-1, corresponding to a yield of 85% based on the acrolein reacted. The chloropropanol had a boiling point (B.P.$_{12}$) of 56° to 59°C. and a refractive index ($n_D^{20}$) of 1.4443.

EXAMPLE 3

There were introduced into a mixture of 112 parts of acrolein and 87 parts of toluene 60 parts of hydrogen chloride at −5° to +5°C. The reaction mixture was dropped into a solution of 20 parts of sodium boranate in 200 parts of water held at 20° to 25°C. in the course of 30 minutes. After a further 10 minutes the phases were separated. The aqueous solution was treated with 25 parts of sodium chloride and extracted with 87 parts of toluene. The toluene phases were united. The toluene was driven off at reduced pressure at 40°C. In the subsequent distillation there were recovered 142 parts of 3-chloropropanol-1. This corresponds to a yield of 75% based on the acrolein added. The chloropropanol had a boiling point (B.P.$_{12}$) of 57° to 59°C. and a refractive index ($n_D^{22}$) of 1.4449.

In example 1 the amount of hydrogen chloride is 0.96 mole per mole of acrolein, in example 2 the amount of hydrogen chloride is 0.86 mole per mole of acrolein, and in example 3, the amount of hydrogen chloride is 0.82 mole per mole of acrolein. Thus in the examples the range of hydrogen chloride is from 0.82 to 0.96 mole per mole of the acrolein.

What is claimed is:

1. A process for the production of 3-chloropropanol-1 comprising:
   1. reacting acrolein in an inert solvent with hydrogen chloride at −30° to +50°C., there being used 0.82 to 0.96 mole of hydrogen chloride per mole of acrolein, to form chloropropionaldehyde; and
   2. then reducing the chloropropionaldehyde with an alkali boranate at 0° to 50°C., there being employed 0.20 to 1.00 mole of the boranate per mole of chloropropionaldehyde.

2. A process according to claim 1 wherein the alkali boranate is sodium boranate or potassium boranate.

3. A process according to claim 2 wherein the reduction is carried out at 15° to 35°C.

4. A process according to claim 1 wherein the excess acrolein is removed from the reaction mixture before reacting the chloropropionaldehyde with the alkali metal boranate.

5. A process according to claim 1 wherein the entire reaction mixture in which the chloropropionaldehyde is formed is treated with the alkali metal boranate.

6. A process according to claim 1 wherein there is used 0.86 moles of hydrogen chloride based on the moles of acrolein.

7. A process according to claim 1 wherein the excess acrolein is removed from the organic solvent solution prepared in step (1) and the remaining organic solution is treated with the alkali metal boranate.

8. A process according to claim 7 wherein the alkali metal boranate is employed as an aqueous solution.

9. A process according to claim 1 wherein the inert organic solvent is an aromatic hydrocarbon, a halogenated hydrocarbon, an aliphatic ether, dioxane, tetrahydrofuran or tetrahydropyran.

10. A process according to claim 1 comprising (1) reacting 70 parts of hydrogen chloride with 112 parts of acrolein at 14° to 17°C. in tetrahydrofuran to form chloropropionaldehyde and (2) reducing of the chloropropionaldehyde containing mixture thus prepared within 20 parts of sodium boranate in water at 25° to 30°C.

11. A process according to claim 1 comprising (1) reacting 63 parts of hydrogen chloride with 112 parts of acrolein at 12° to 18°C. in 1,4-dioxane to form chloropropionaldehyde, (2) removing excess acrolein from the reaction mixture and then (3) reducing the chloropropionaldehyde containing mixture thus prepared with 20 parts of sodium boranate in water at 20° to 30°C.

12. A process according to claim 1 comprising (1) reacting 60 parts of hydrogen chloride with 112 parts of acrolein at −5° to +5°C. in toluene to form chloropropionaldehyde and (2) then reducing the chloropropionaldehyde containing mixture thus prepared with 20 parts of sodium boranate in water at 20° to 25°C.

* * * * *